O. FALLER.
EVAPORATOR.
APPLICATION FILED NOV. 10, 1911.
1,028,086.
Patented May 28, 1912.
2 SHEETS—SHEET 1.
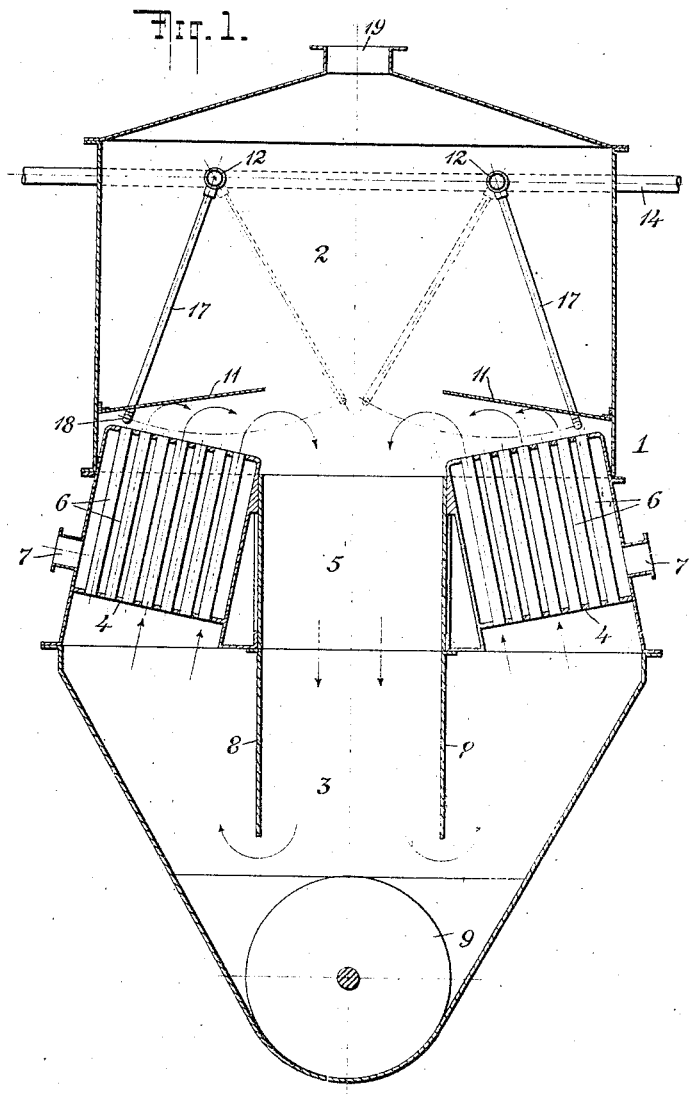
WITNESSES
G. V. Rasmussen
J. A. Ferguson
INVENTOR
OSCAR FALLER
BY
Biesen McGrath
ATTORNEYS

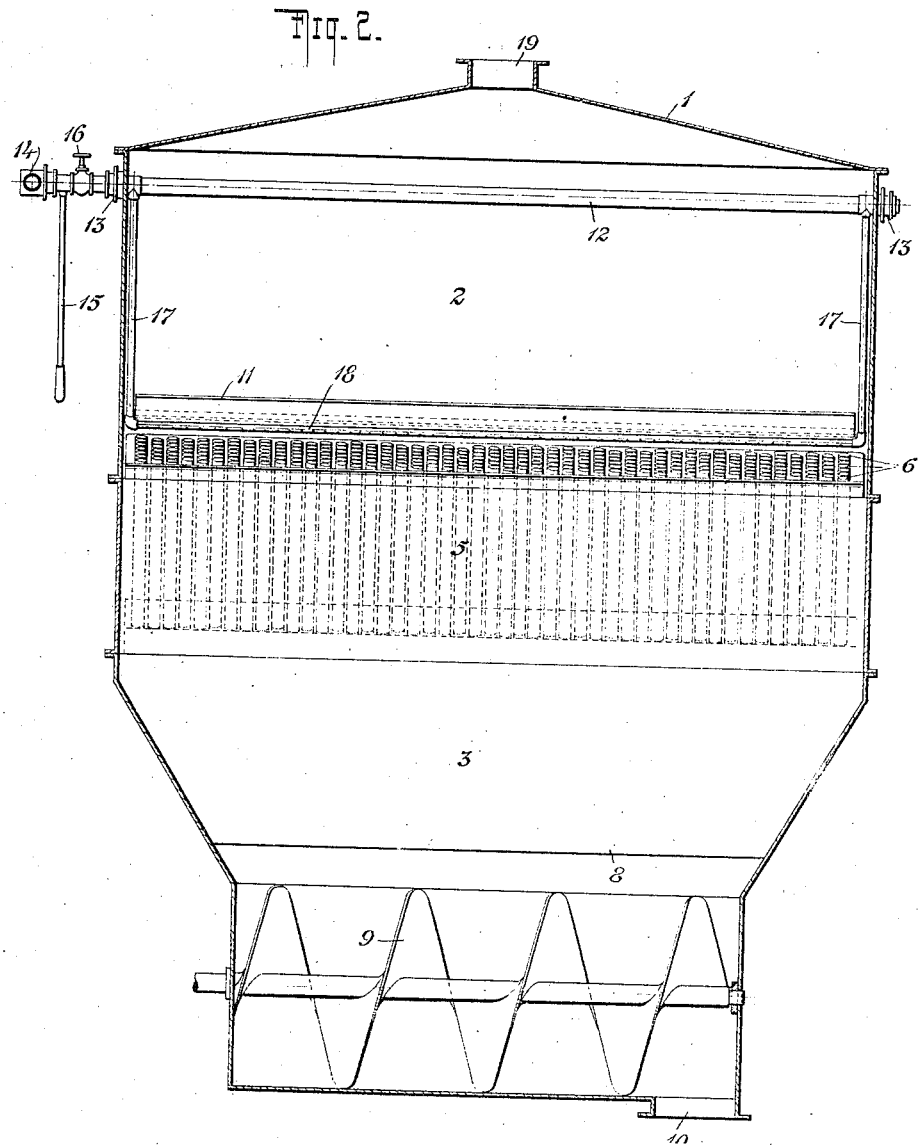

UNITED STATES PATENT OFFICE.

OSCAR FALLER, OF MUNICH, GERMANY, ASSIGNOR TO GEORGE STROH, OF DETROIT, MICHIGAN.

EVAPORATOR.

1,028,086.     Specification of Letters Patent.     Patented May 28, 1912.

Application filed November 10, 1911. Serial No. 659,516.

*To all whom it may concern:*

Be it known that I, OSCAR FALLER, a citizen of the German Empire, and a resident of Munich, Bavaria, Germany, have invented a new and useful Improvement in Evaporators, of which the following is a specification.

My invention relates to apparatus for evaporating liquids and particularly liquids containing solid substances and such as deposit mud, scale, crystals or other solid substances when subjected to a process of evaporation.

One of the objects of my invention is the provision, in apparatus of this kind, of means whereby a rapid circulation of the contents thereof is assured, so that the clogging up of the passages by the accretion of deposit is reduced to a minimum.

Another object is the provision of means for conveniently accomplishing the removal of deposit from those portions of the apparatus which especially are apt to become obstructed or clogged up by the deposit, said means being adapted to be operated without interfering with the ordinary, continuous operation of the evaporator.

Other objects of my invention will be pointed out or will otherwise appear in the following description of an embodiment of my invention, which is especially adapted for the evaporation of salt brine and which is illustrated by the accompanying drawings, in which—

Figure 1 is a vertical cross section of the evaporator, and Fig. 2 is a vertical longitudinal section of the same.

The evaporator illustrated comprises a vessel 1 having an upper chamber 2 and a lower chamber 3, said chambers being connected at the sides of the vessel by conduits 4 which are adapted to be heated so that the brine in the vessel will tend to move upwardly through said conduits from the lower chamber to the upper chamber, and by a conduit 5 located between the heating conduits through which the brine is adapted to flow downwardly from the upper chamber to the lower chamber. Each of the side or heating conduits 4 comprises a casing adapted to contain a heating fluid, such as, for example, steam, and having a group of parallel heating tubes or elements 6 extending therethrough and disposed at an acute angle to the perpendicular, toward the center of the upper chamber, the tubes of one casing being therefore disposed oppositely to those of the other casing. The heating fluid is introduced into the casing about the tubes 6 through a conduit 7. The construction and general arrangement of the heating apparatus shown is similar to that shown and described in my patent for an improvement in evaporators, numbered 907,109 and dated December 15, 1908. Any other suitable type of heater may be used since the particular construction of a heater is not a part of my present invention.

Extending below the heater elements into the chamber 3 so as to form an extension of the conduit 5 are plates 8. These plates form partitions separating the central downwardly flowing contents of the evaporator from the upwardly flowing streams thereof at the sides and are of such dimensions as to require the circulation to extend into proximity to the bottom of the evaporator. Portions of the side walls of the chamber 3 slope downwardly toward each other and meet at the extreme bottom of the evaporator in a cylindrically curved portion with which the screw conveyer 9 coöperates in an obvious manner to move the solid material which may have settled to the bottom of chamber 3 toward the outlet 10. The sloping sides of the chamber serve to direct the solid material toward the conveyer.

To the side walls of the upper chamber 2 deflecting plates 11 are secured, said plates extending over the tops of the heater pipes at a suitable distance therefrom and so disposed with reference to the direction of said pipes that liquid spurting upwardly therefrom will strike the plates and be deflected by them toward the central return passage 5.

Above each of the plates 11 and extending parallel thereto is a pipe 12 which pierces the end walls of the chamber 2, said walls serving as bearings therefor. The bearings are made fluid tight by means of stuffing boxes 13. One end of each pipe is closed in any suitable manner and the other end is connected with a feed pipe 14, exteriorly of the evaporator, the connection being such that the pipe 12 may be rotated through a definite angle by means of a handle 15. Each pipe 12 is provided exteriorly of the evaporator with a valve 16.

Within the chamber 2 and near the end walls thereof pipes 17 are connected with each of the pipes 12, their lower ends being connected by a horizontal spray pipe 18 having orifices along its lower portions. The pipes 17 are of suitable length so that each of the pipes 18 is situated below the plate 11 and in proximity to the heating pipes, so that when the handles 15 are operated the spray pipes 18 sweep over the upper ends of the heater pipes 6. The usual extent of movement of these pipes 18 is illustrated in Fig. 1 by the full line and dotted line positions of the pipes 17. The plates 11 obviously do not extend to the end walls of the evaporator because of the necessity of allowing a space for the movement of the pipes 17.

In the operation of the evaporator, salt brine is introduced through the inlet 19 until it reaches a level above the heater pipes but below the deflector plates and the heater pipes are heated by admitting a heating medium such as steam through the inlets 7. The brine within the heater pipes soon begins to boil and, as will be readily understood, flows upwardly within them with great rapidity, so that it is ejected from their upper ends with considerable force. During the boiling brine may be introduced continuously and a vacuum may be produced in the upper chamber in any well-known way. The jets expelled from the pipes 6 strike against the angularly disposed plates 11 and are deflected toward the return conduit 5.

In apparatus of this kind not equipped with deflector plates, the jets of liquid ejected from the heating tubes spurt high into the upper chamber. The liquid issuing from the rows of heating tubes positioned near the sides of the evaporator falls upon the rows nearer the center or upon the liquid issuing therefrom. It is evident that this results in decreasing the circulation of liquid in the inner tubes and consequently decreases the circulation and evaporative efficiency of the apparatus as a whole. Furthermore when the evaporating process has been continued until crystals begin to separate out, such crystals tend first to gather at the upper ends of the heater casings between the pipes and consequently between the issuing jets of liquid. These crystals grow rapidly and even extend over the edges of the pipes into their interior spaces with the result that the pipes become more or less choked or clogged up. The operation of the apparatus must now be suspended and the tubes and casings must be washed out or boiled out with water. In some cases the boiling out has to be done twice in twenty-four hours with the loss, of course, of salt, time and heat.

The use of the deflector plates 11 prevents to a large degree the formation of crystals at the upper ends of the heater casings, because the issuing jets of brine are turned sharply by them toward the channel 5 thus causing a more rapid circulation of brine in the evaporator. The plates also produce a sweeping current of liquid across the upper faces of the heaters which obviously is effective to catch and carry along the accretions of crystals which might form at these points. The crystals are thus forcibly swept into the conduit 5, through which they settle to the bottom of the chamber 3.

The space between each of the plates 11 and the upper surface of the heater device is such that in the boiling operation, said space is practically completely filled with ejected liquid. The plate is angularly disposed so that the space becomes increasingly greater toward the center of the evaporator in order to accommodate the increasing volume of liquid which flows through it to the conduit 5. Near the outside row of heater tubes the space, as may be readily seen by referring to Fig. 1 of the drawings, is comparatively small because it has to accommodate only the liquid issuing from the outside row of tubes. Near the inner row, however, the space is comparatively large because it has to accommodate not only the liquid issuing from the inner row of tubes but also that issuing from all of the other rows. The force of the ejection of liquid from the various tubes is utilized to produce a rapid circulation, in part, by deflecting the issuing jets toward the return conduit, and, in part, by causing a suction in the heater tubes by directing the ejected liquid across the ends thereof. The rapidity of the circulation is such that the liquid, which when at rest covers the ends of all of the heating tubes, is lowered in level to a point below the lowermost tube when the boiling operation is being performed.

The plates 8 serve to lengthen the conduit 5, so that the crystals travel downward a greater distance toward the bottom of the evaporator and therefore have more time to settle. The current of descending liquid, furthermore, has a greater tendency to force the crystals therein in a downward direction because of the increased length of the return conduit. The settled crystals are removed in an obvious manner by the operation of the conveyer. In case there are accretions of crystals at the upper ends of the heaters on the surfaces of the casings between the pipes or even within the pipes, water under pressure or other fluid capable of dissolving the deposited solid is caused to flow from the feed pipe 14, through the pipes 12, and 17 to the spray pipes 18 by the operation of the valves 16. The spray pipes are moved from their inoperative positions shown in dotted lines in Fig. 1 and swept back and forth over the upper ends of the heater pipes by operating the handles 15. It will be readily understood that the finely divided streams of water issuing from the spray pipes will effectively remove by dissolving them, the clusters of crystals at the upper ends of the heaters. The removal of deposits in this manner is quickly accomplished without the necessity, heretofore unavoidable, of removing the contents of the apparatus and then washing it out.

By the use of my spray apparatus either water or an unsaturated solution of salt may be used. In either case by the spray device only so much of the dissolving liquid may be admitted as is necessary to dissolve the deposited crystals; the solution formed is thus practically a saturated solution from which crystals can be separated out without prolonged evaporation. When not in use the spray pipes may be withdrawn to the inoperative position, shown in dotted lines in Fig. 1, in which they may be retained by any suitable means until again desired to be used.

My invention thus comprises a structure by which both the formation of deposit in places where it would greatly interfere with or prevent the proper and efficient operation of the evaporating apparatus is greatly prevented and the easy removal of whatever deposit is formed is assured without the heretofore unavoidable expense, loss of time and other objectionable features incident to stopping the operation of the apparatus.

I claim:

1. An evaporator for liquids containing solid substances, comprising in combination an upper chamber, a lower chamber, a conduit connecting said chambers, a heating element also connecting said chambers, and a spray pipe connected with a supply of water under pressure and provided with a discharge orifice so disposed as to direct water upon the upper end of said heating element.

2. An evaporator for liquids containing solid substances, comprising in combination an upper chamber, a lower chamber, a conduit connecting said chambers, a heating element comprising a casing and a plurality of tubes extending through said casing and connecting said chambers, and a spray pipe connected with a supply of water under pressure and provided with a plurality of discharge orifices so disposed as to direct water upon the upper end of said heating element.

3. An evaporator for liquids containing solid substances, comprising in combination an upper chamber, a lower chamber, a conduit connecting said chambers, a plurality of heating tubes also connecting said chambers, an oscillatory pipe within said upper chamber and having a valved connection with a supply of water under pressure, a spray pipe connected with said oscillatory pipe and provided with a plurality of discharge orifices, whereby when said oscillatory pipe is operated, said spray pipe is caused to move in an arcuate path above the upper ends of said heating tubes, the discharge orifices of said spray pipe being so disposed as to direct water, during this movement, upon and in proximity to the upper ends of said heating tubes.

4. An evaporator for liquids containing solid substances comprising in combination, an upper chamber, a lower chamber, a conduit connecting said chambers, a heating element also connecting said chambers and a deflecting plate above said element and disposed at an angle to the direction of issuance of liquid from said element, such that the issued liquid is deflected substantially directly toward said conduit.

5. An evaporator for liquids containing solid substances, comprising in combination an upper chamber, a lower chamber, a conduit connecting said chambers, a heating element also connecting said chambers and a deflecting plate above said element, said plate being so disposed as to receive substantially all of the liquid issuing from said element and deflect it toward said conduit.

6. An evaporator for liquids containing solid substances, comprising in combination an upper chamber, a lower chamber, a conduit connecting said chambers, a heating element also connecting said chambers and a deflecting plate disposed at an angle to said element and separated from the upper end thereof by a space such that, during the operation of the evaporator, said space is substantially, completely filled with liquid issuing from the element, whereby said liquid is deflected toward said conduit and is caused to sweep over the upper end of said element.

7. An evaporator for liquids containing solid substances, comprising in combination an upper chamber, a lower chamber, a conduit connecting said chambers, heating tubes also connecting said chambers, a deflector plate disposed above the upper ends of said tubes at an angle thereto for deflecting the liquid issuing from said tubes, toward said conduit, a spray pipe connected with a supply of water under pressure, adapted to move laterally of and between said plate and said heating tubes, and provided with suitably disposed discharge orifices, whereby water is directed into and between the upper ends of said heating tubes.

In testimony whereof, I have hereunto set my hand in the presence of two subscribing witnesses.

OSCAR FALLER.

Witnesses:
G. E. Stroh,
Theo. C. Bez.